US008612082B2

(12) United States Patent
Hashimoto et al.

(10) Patent No.: US 8,612,082 B2
(45) Date of Patent: Dec. 17, 2013

(54) DEVICE FOR CALCULATING POWER CONSUMPTION OF VEHICLE, INFORMATION PROVIDING DEVICE, AND INFORMATION PROVIDING METHOD

(75) Inventors: Takahisa Hashimoto, Tokyo (JP); Yoshitaka Kinoshita, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/812,729

(22) PCT Filed: Jun. 29, 2011

(86) PCT No.: PCT/JP2011/064881
§ 371 (c)(1),
(2), (4) Date: Jan. 28, 2013

(87) PCT Pub. No.: WO2012/014615
PCT Pub. Date: Feb. 2, 2012

(65) Prior Publication Data
US 2013/0131892 A1    May 23, 2013

(30) Foreign Application Priority Data
Jul. 30, 2010  (JP) ................................. 2010-171400

(51) Int. Cl.
*B60L 9/00*    (2006.01)

(52) U.S. Cl.
USPC ............................................. 701/22; 701/1

(58) Field of Classification Search
USPC ........................................................ 701/1, 22
See application file for complete search history.

(56) References Cited

U.S. PATENT DOCUMENTS

| 6,864,807 | B2 | 3/2005 | Todoriki et al. | |
|---|---|---|---|---|
| 2002/0107618 | A1* | 8/2002 | Deguchi et al. | 701/22 |
| 2003/0006914 | A1 | 1/2003 | Todoriki et al. | |
| 2009/0150016 | A1* | 6/2009 | Hung et al. | 701/22 |
| 2009/0259355 | A1* | 10/2009 | Li | 701/22 |
| 2011/0022255 | A1* | 1/2011 | Yamada et al. | 701/22 |
| 2011/0032110 | A1 | 2/2011 | Taguchi | |
| 2011/0066310 | A1* | 3/2011 | Sakai et al. | 701/22 |
| 2011/0264317 | A1* | 10/2011 | Druenert et al. | 701/22 |
| 2012/0010767 | A1* | 1/2012 | Phillips et al. | 701/22 |
| 2012/0010768 | A1* | 1/2012 | Phillips et al. | 701/22 |
| 2012/0035795 | A1* | 2/2012 | Yu et al. | 701/22 |
| 2012/0109515 | A1* | 5/2012 | Uyeki et al. | 701/423 |

(Continued)

FOREIGN PATENT DOCUMENTS

| JP | 3758140 B2 | 3/2006 |
|---|---|---|
| JP | 2007-199034 A | 8/2007 |

(Continued)

*Primary Examiner* — Hussein A. ElChanti
(74) *Attorney, Agent, or Firm* — Foley & Lardner LLP

(57) ABSTRACT

Information providing device has: travelling route searching section searching for a travelling route; and power consumption amount calculating section calculating a total power consumption amount. The power consumption amount calculating section has: first calculating section that refers to travel information correlated with a first unit area that belongs to the searched travelling route and calculates each first power consumption amount consumed to travel in the first unit area; second calculating section that refers to weather information forecasted for each second unit area that belongs to the searched travelling route, predicts setting temperature of an air conditioner and calculates each second power consumption amount consumed when the air conditioner into which the predicted setting temperature is inputted is operated during the travel in the second unit area; and totalizing section that calculates the total power consumption amount on the basis of the first and second power consumption amounts.

14 Claims, 8 Drawing Sheets

(56) References Cited

U.S. PATENT DOCUMENTS

2012/0209462 A1* 8/2012 Roos et al. ............... 701/22
2012/0310471 A1* 12/2012 Sengoku et al. .......... 701/31.5
2013/0002188 A1* 1/2013 Uyeki ....................... 320/101

FOREIGN PATENT DOCUMENTS

| | | |
|---|---|---|
| JP | 2009-137340 A | 6/2009 |
| JP | 2009-137456 A | 6/2009 |
| JP | 2011-038845 A | 2/2011 |

* cited by examiner

| LINK ID | AVERAGE SPEED (Km/h) | LINK LENGTH (m) | LINK TRAVELLING TIME (s) | ROAD INCLINATION (degree) | POWER CONSUMPTION AMOUNT (Wh) | DATE | TIME |
|---|---|---|---|---|---|---|---|
| 100 | 40 | 100 | 9 | 0 | 150 | 2010/3/15 | 15 : 00 |
| 150 | 50 | 200 | 15 | 2 | 240 | 2010/3/15 | 16 : 00 |
| ... | ... | ... | ... | ... | ... | ... | ... |
| 1493 | 80 | 100 | 8.5 | 1.5 | 190 | 2010/3/15 | 23 : 00 |

FIG.3

| LINK ID | MESH ID | POSTCODE | ADDRESS | DATE | TIME | WEATHER | OUTSIDE AIR TEMPERATURE | LINK TRAVELLING TIME (s) |
|---|---|---|---|---|---|---|---|---|
| 100 | 1 | 105-0011 | Shiba-park Minato Ward, Tokyo | 2010/3/15 | 15:00 | FINE WEATHER | 20 | 9 |
| 150 | 2 | 135-0022 | Miyoshi Koto Ward, Tokyo | 2010/3/15 | 16:00 | CLOUDY WEATHER | 19 | 15 |
| ... | ... | ... | | | | | | ... |
| 1493 | 10 | 115-0011 | Shintomi Chuo Ward, Tokyo | 2010/3/15 | 23:00 | CLOUDY WEATHER | 12 | 8.5 |

| USER ID | DATE | TIME | OUTSIDE AIR TEMPERATURE | AIR CONDITIONER SETTING TEMPERATURE |
|---|---|---|---|---|
| ABC123 | 2008/1/31 | 16 : 00 | 2 | 20 |
| : | 2008/3/31 | 16 : 00 | 12 | 20 |
| : | 2008/4/31 | 16 : 00 | 20 | 25 |
| : | 2008/5/31 | 16 : 00 | 25 | 25 |
| : | 2008/7/31 | 16 : 00 | 30 | 25 |
| 12345D | 2008/2/1 | 1 : 00 | -5 | 18 |
| BBBBCC | 2009/8/15 | 19 : 00 | 23 | 17 |

| OUTSIDE AIR TEMPERATURE | SETTING TEMPERATURE | SOLAR RADIATION | POWER (W) |
|---|---|---|---|
| 35 | 25 | ABSENCE | 1200 |
| 30 | 25 | ABSENCE | 550 |
| 25 | 25 | ABSENCE | 1100.5 |
| 20 | 25 | ABSENCE | 1600 |
| 40 | 28 | PRESENCE | 1698 |
| 25 | 25 | PRESENCE | 1255.3 | ic
DEVICE FOR CALCULATING POWER CONSUMPTION OF VEHICLE, INFORMATION PROVIDING DEVICE, AND INFORMATION PROVIDING METHOD

TECHNICAL FIELD

The present invention relates to a power consumption amount calculating device, an information providing device and an information providing method which calculate and provide information about power consumption of a vehicle that mounts therein a battery.

BACKGROUND ART

As this kind of information providing device, an information providing device, which calculates a cruising range corresponding to an energy remaining amount of a vehicle by referring to consumption information (travel distance/state of charge) about energy consumption of the vehicle and provides a travelable range based on the calculated cruising range, has been known (see Patent Document 1).

However, when the weather changes, since a utilization state of an air conditioner of the vehicle changes, a power consumption amount of the vehicle varies. Because of this, there arises a problem that it is not possible to provide accurate information about the power consumption amount to a user of the vehicle.

CITATION LIST

Patent Document

Patent Document 1: Japanese Patent No. 3758140

SUMMARY OF THE INVENTION

An object of the present invention is to provide the accurate information about the power consumption amount of the vehicle to the user of the vehicle with consideration given to the air conditioner utilization state of the vehicle which changes according to the weather.

In the present invention, a first power consumption amount consumed during a travel is calculated by referring to travel information correlated with an area of a travelling route leading to a destination, a second power consumption amount consumed when an air conditioner is operated during the travel is calculated by referring to weather information of the travelling route, and a total power consumption amount is calculated on the basis of these first power consumption amount and second power consumption amount. With this calculation, the above problem is solved.

According to the present invention, since the total power consumption amount when passing through the travelling route is calculated with the power amount consumed in the case where the air conditioner is operated during the travel included, it is possible to estimate or predict the total power consumption amount according to the weather. As a consequence, even if the utilization state of the air conditioner changes according to the weather, the present invention can provide accurate information about the power consumption amount of the vehicle to the user.

BRIEF DESCRIPTION OF DRAWINGS

FIG. 2 is a drawing showing an example of travel information correlated with a first unit area.

FIG. 3 is a drawing showing an example of weather information correlated with a second unit area.

FIG. 4 is a drawing showing an example of a setting temperature table created on the basis of a history of a setting temperature that is inputted into an air conditioner by a user of a vehicle.

FIG. 5 is a drawing showing an example of a power consumption table indicating outside air temperature, the setting temperature and a power consumption of the air conditioner.

DESCRIPTION OF EMBODIMENTS

In the following description, an information providing device 100 of the present embodiment according to the present invention will be explained with reference to the drawings. In the present embodiment, an example of a drive plan system 1 having the information providing device 100 will be explained. The drive plan system 1 is a device that receives input of a departure point (a start point) and a destination from a user or a vehicle through an information communication network 600 then provides a travelling route leading to the destination to guide the user or the vehicle, and further provides information about necessity of charging, a place of a charging facility in a case where the charging is carried out and a power consumption amount such as a charge amount.

Figure 1:
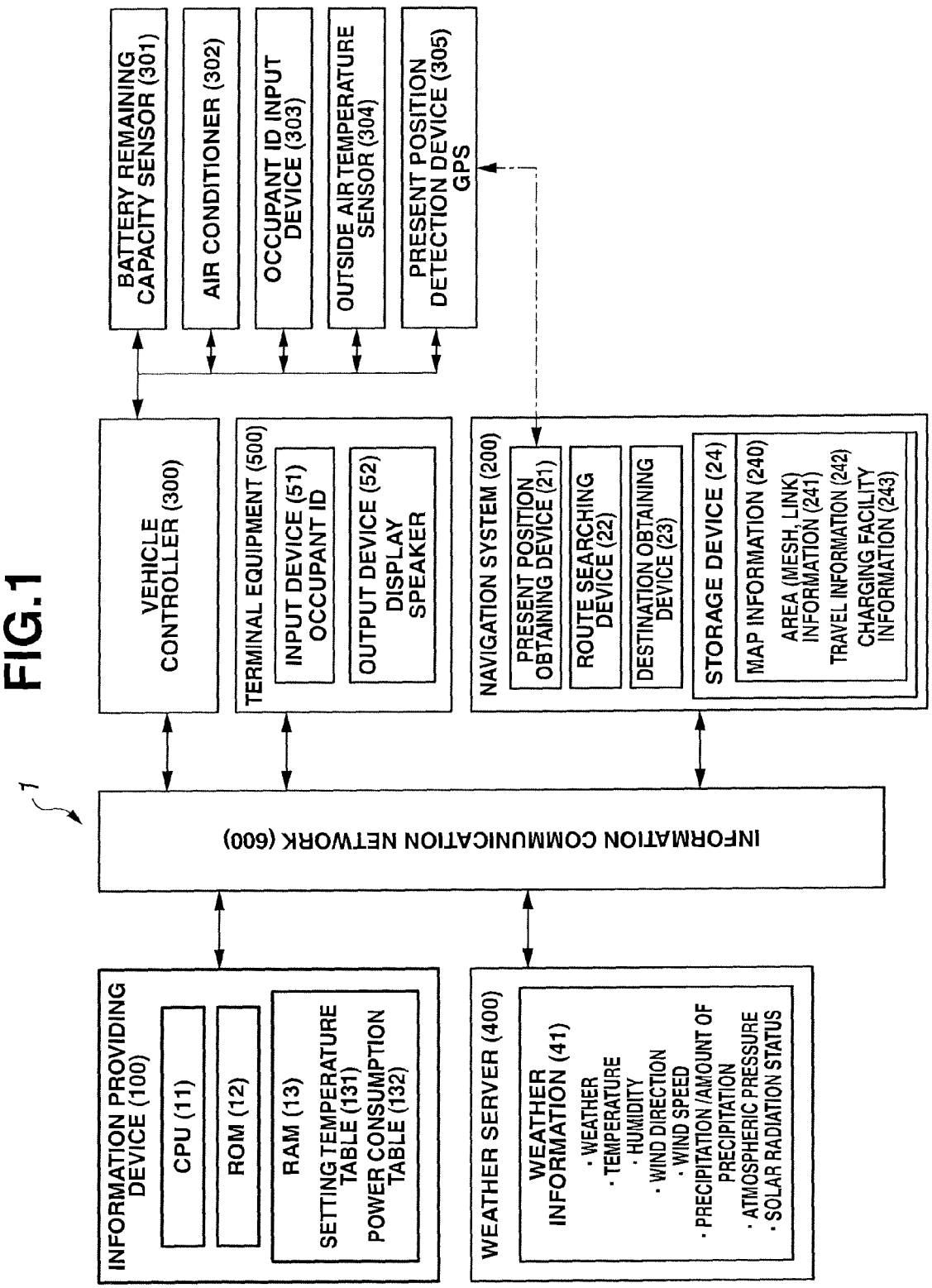
FIG. 1 is a block diagram of a drive plan system 1 including an information providing device 100 of the present embodiment according to the present invention.

FIG. 1 is a block diagram of the drive plan system 1 including the information providing device 100 of the present embodiment according to the present invention. As shown in FIG. 1, the drive plan system 1 of the present embodiment has cooperating devices including a navigation system 200, a vehicle controller 300, a server 400 and terminal equipment 500 besides the information providing device 100. Each of these has a wired or a wireless communication device, and is able to receive/send information from/to each other through the information communication network 600 such as the Internet. Here, the information providing device 100, the server 400 and the navigation system 200 of the present embodiment can be arranged as a server device on the network.

Each cooperating device will be explained. The navigation system 200 is a device that can search for the travelling route from the departure point (a present point) to the destination.

The vehicle controller 300 obtains each information of a remaining capacity sensor 301 of a battery mounted in the vehicle, an air conditioner 302, an occupant ID input device 303 by which a key and the other individual authentication information are inputted, an outside air temperature sensor 304 that detects outside air temperature (temperature outside the vehicle, vehicle exterior temperature) and a present position detection device 305, and can send the information to the other cooperating devices such as the information providing device 100 through the information communication network 600.

The server 400 is a device that stores weather information, after-mentioned travel information, etc., and can send these information to the cooperating devices such as the information providing device 100 when requested.

The terminal equipment 500 is a device that has an input device 51 such as a switch by which the user inputs information when using the drive plan system 1, also has an output device 52 such as a display and a speaker by which the information providing device 100 outputs the information about the power consumption amount of the request vehicle. Here, regarding the above-mentioned occupant ID, it is also possible for the user to input the occupant ID using this input device 51.

In the following description, the information providing device 100 of the present embodiment according to the present invention will be explained. The information providing device 100 of the present embodiment provides the information about the power consumption amount to the user who uses a vehicle mounting therein the battery such as an electric vehicle and a hybrid vehicle.

As shown in FIG. 1, the information providing device 100 of the present embodiment has a ROM (Read Only Memory) 12 storing a program to calculate the information about the power consumption amount and to provide it to the vehicle user, a CPU (Central Processing Unit) 11 as an operation circuit that functions as the information providing device 100 by executing the program stored in this ROM 12 and a RAM (Random Access Memory) 13 functioning as an accessible storage device.

The information providing device 100 of the present embodiment is provided with a travelling route searching function, a power consumption amount calculating function and an information providing function. The information providing device 100 of the present embodiment can perform each function with software for fulfilling the above functions and the above-mentioned hardware cooperating with each other.

Each function performed by the information providing device 100 will be explained below.

First, the travelling route searching function of the information providing device 100 will be explained. The information providing device 100 of the present embodiment refers to map information on the basis of the present position obtained of the vehicle and the destination obtained, then searches for the travelling route leading to the destination. Although the information providing device 100 also can perform the searching process of the travelling route by the integrated CPU 11, the information providing device 100 of the present embodiment makes a route searching device 22 of the navigation system 200 execute the searching process of the travelling route, then obtains information of the searched travelling route from the navigation system 200.

A present position obtaining device 21 of the navigation system 200 obtains the present position of the vehicle from the vehicle-mounted present position detection device 305. The present position detection device 305 has a position detection device such as a GPS (Global Positioning System). Further, a destination obtaining device 23 obtains the destination that is inputted from the input device 51 of the terminal equipment 500.

A storage device 24 of the navigation system 200 stores general map information 240 including route and position of the facility. In the map information 240 of the present embodiment, area information 241 that includes a block (a mesh) defined by a coordinate etc. on the map information also includes information about a link, travel information 242 that includes a distance of a first unit area (in a case of the mesh, a distance of a part along a road), an inclination of each first unit area (in the case of the mesh, an inclination of the part along the road), a power consumption amount (Wh) required to pass through each first unit area (in the case of the mesh, a power consumption amount (Wh) required to pass through the part along the road) and an average speed of each first unit area (in the case of the mesh, an average speed of the part along the road), and charging facility information 243 that includes the position of the charging facility, are included.

Here, the first unit area is the mesh (a predetermined block or zone) defined by the coordinate on the map information 240 or the link of the road whose both ends are defined by a node on the route included in the map information 240. Here, a first unit area belonging to the travelling route is a link that forms the travelling route or an area such as a mesh including a link that forms a travelling road.

Then, the route searching device 22 searches for the travelling route leading to the destination by referring to the map information 240 on the basis of the present position obtained of the vehicle and the destination obtained. A manner of the search of the travelling route is not especially limited, and a normal manner can be used.

Next, the total power consumption amount calculating function of the information providing device 100 will be explained. The information providing device 100 calculates a total power consumption amount which the vehicle consumes when travelling along the searched travelling route. More specifically, the total power consumption amount calculating function of the information providing device 100 has a first calculating function, a second calculating function and a totalizing function.

Each function will be explained. The first calculating function refers to the travel information 242 correlated with the first unit area included in the map information 240 of the navigation system 200 described above, then calculates a first power consumption amount consumed to travel in the first unit area.

FIG. 2 is a drawing showing an example of the travel information 242 correlated with the first unit area (the link). As shown in FIG. 2, the first unit area (the link) is identified or differentiated by a link ID (an identifier) that is given on the map information 240. Then, for each link, an average speed (Km/h), a link length (m) which is a distance between the nodes of the link, a link travelling time (s) required to pass through the link, a road inclination (degree) and a power consumption amount (Wh) consumed to pass through the link, are correlated with each link. In the travel information 242 shown in FIG. 2, histories of date and time when the vehicle passes through the link are added.

FIG. 2 shows the travel information 242 of the case where the first unit area is the link. However, in a case where the first unit area is the mesh, the mesh that is the first unit area is identified or differentiated by a mesh number that is given on the map information 240. Then, for each mesh, an average speed (Km/h) of a part along the travelling route in the mesh, a distance of the part along the travelling route in the mesh (a distance between two contact points; one is the contact point between one end of the travelling route in the mesh and one side of the mesh, the other is the contact point between the other end of the travelling route in the mesh and the other side of the mesh), a mesh travelling time (s) required to pass through the part along the travelling route in the mesh, a road inclination (degree) of the part along the travelling route in the mesh and a power consumption amount (Wh) consumed to pass through the part along the travelling route in the mesh, are correlated with each mesh.

The first calculating function identifies the link ID belonging to the travelling route, and calculates the first power consumption amount on the basis of the power consumption amount correlated with the link ID.

Next, the second calculating function will be explained. The information providing device 100 refers to weather information 41 predicted (or forecasted) for each second unit area of the searched travelling route, then predicts a setting temperature inputted into the air conditioner 302 when travelling in the second unit area. Further, the information providing device 100 calculates a second power consumption amount consumed in a case where the air conditioner 302 into which the predicted setting temperature is inputted is operated during the travel in the second unit area.

The second unit area is the mesh or the link, which is same as the above-mentioned first unit area. The second unit area could be the same mesh or the same link as that of the first unit area, or could be a different mesh or a different link from that of the first unit area. In the case where the second unit area and the first unit area are the same, since common use of the travel information 242 and the weather information 41 can become possible and efficiency of processing or computations can be increased, high-speed processing can be expected.

The information providing device 100 obtains the weather information 41 at a predetermined time interval from the weather server 400 that provides the weather information through the information communication network 600. The weather information 41 includes weather (fine weather, cloudy weather, rainy weather, etc.), temperature, humidity, wind direction, wind speed, the presence or absence of rain, precipitation (amount of precipitation), atmospheric pressure, etc. Here, in a case where there occurs a change in contents of the weather information 41 obtained at the predetermined time interval, a flag that indicates the change can be raised. This flag can be a trigger of a command to recalculate the second power consumption amount. In the present embodiment, when the change in the contents of the weather information 41 occurs, since it is predicted that the second power consumption amount changes, the recalculation can be carried out.

FIG. 3 is a drawing showing an example of (a part of) the weather information 41 correlated with the second unit area. As shown in FIG. 3, in the second unit area (the mesh or the link), postcode and/or address where the second unit area is included are added. Further, the weather (weather forecast) and the temperature (predicted temperature) which are predicted for each second unit area are correlated with date and time. With this correlation, it is possible to obtain the weather (the weather forecast) and the temperature (the predicted temperature) of the date of the link that has the link ID "100". Further, as shown in FIG. 3, it could be possible to correlate the travelling time (passing distance/average speed) of the second unit area (the mesh or the link) of the weather information 41.

The second calculating function of the information providing device 100 refers to the weather information 41 predicted for each second unit area, then predicts the setting temperature inputted into the air conditioner 302 when travelling in the second unit area. A manner of the prediction of the setting temperature is not especially limited. However, the information providing device 100 retrieves the temperature (the outside air temperature, atmospheric temperature) of the second unit area of the searched travelling route from the weather information 41, then can predict the temperature inputted into the air conditioner 302 by the user when travelling in the second unit area by referring to a correlation (a setting temperature table 131) that previously correlates the outside air temperature with the setting temperature of the air conditioner 302. Further, when the flag, which indicates that the change in the contents of the weather information obtained at the predetermined time interval occurs, is raised, it is possible to predict the temperature inputted into the air conditioner 302 again.

FIG. 4 is a drawing showing an example of the setting temperature table 131 (the correlation) created on the basis of a history of the setting temperature inputted into the air conditioner 302 by the user.

Although the manner of the prediction of the setting temperature is not especially limited, the second calculating function of the information providing device 100 refers to the setting temperature table 131 (the correlation) as shown in FIG. 4, which is created on the basis of the history of the setting temperature inputted into the air conditioner 302 and indicates the outside air temperature and the setting temperature, then can predict the setting temperature inputted into the air conditioner 302 by the user when travelling in the second unit area according to a user ID (the occupant ID) obtained. By using this setting temperature table 131 (the correlation), it is possible to statistically determine the setting temperature corresponding to a certain outside air temperature on the basis of the input history of the setting temperature of the past. An accurate prediction of the setting temperature can therefore be made.

In the setting temperature table 131 shown in FIG. 4, the user ID is added, and the setting temperature inputted into the air conditioner 302 by each user, the outside air temperature and the date are correlated with each other. According to the setting temperature table 131 (the correlation) where the correlation is divided by each user, it is possible to empirically determine the setting temperature of a specific user corresponding to the certain outside air temperature by obtaining the user ID of the user who uses the drive plan system 1 and referring to the input history of the setting temperature of the user.

Since there is an individual difference in user's feeling about the temperature and in the setting temperature of the heating and the cooling, many cases where the setting temperature is different occur even if the outside air temperature is the same. By using the setting temperature table 131 (the correlation) of each user shown in FIG. 4, since it is possible to grasp user's tendency of the setting temperature corresponding to the outside air temperature, the prediction of an accurate setting temperature according to each user's feeling can be made. Here, the user ID (the occupant ID) can be estimated from a key ID of the vehicle, also it is possible to obtain the user ID (the occupant ID) that is inputted through the input device 51.

The second calculating function of the information providing device 100 of the present embodiment calculates the second power consumption amount consumed in the case where the air conditioner 302 is operated during the travel in the second unit area on the presumption that the predicted setting temperature is inputted. Although a manner of the calculation of the second power consumption amount is not especially limited, the information providing device 100 of the present embodiment calculates the second power consumption amount on the basis of the predicted setting temperature inputted into the air conditioner 302 when travelling in the second unit area and the outside air temperature included in the weather information 41 predicted for the second unit area.

More specifically, the information providing device 100 of the present embodiment previously defines a power consumption table 132 (a correlation) of power consumption (W)

per unit time of the air conditioner 302 for a combination of the outside air temperature and the setting temperature (vehicle interior temperature). Then, by referring to this power consumption table 132 (the correlation), the information providing device 100 calculates the power consumption (W) per unit time of the air conditioner 302 on the basis of the predicted setting temperature and the outside air temperature predicted in the weather information 41.

FIG. 5 is a drawing showing an example of (a part of) the power consumption table 132 indicating the outside air temperature (the vehicle exterior temperature), the setting temperature and the power consumption per unit time of the air conditioner 302. By referring to this power consumption table 132, it is possible to calculate the power consumption per unit time of the air conditioner 302 on the basis of the outside air temperature and the setting temperature.

Further, as shown in FIG. 5, it could also be possible to previously define a power consumption table 132 (a correlation) of the power consumption (W) per unit time of the air conditioner 302, like the above power consumption table 132, for a combination of the outside air temperature, the setting temperature (the vehicle interior temperature) and a solar radiation status. This is because that, feeling temperature of the person is different according to the presence or absence of the solar radiation even the same outside air temperature, and the setting temperature of the air conditioner 302 could be different. By referring to this power consumption table 132, the solar radiation status when travelling in the second unit area is predicted on the basis of the weather information 41, then the power consumption per unit time of the air conditioner 302 into which the predicted setting temperature is inputted can be calculated with consideration given to the predicted solar radiation status.

Furthermore, the second calculating function of the information providing device 100 calculates the second power consumption amount consumed in the case where the air conditioner 302 is operated during the travel in the second unit area from the power consumption per unit time of the air conditioner 302 which is determined on the basis of the correlation of the outside air temperature and the setting temperature (the vehicle interior temperature) or the correlation of the outside air temperature, the setting temperature (the vehicle interior temperature) and the solar radiation status. More specifically, the information providing device 100 obtains the travelling time of the second unit area included in the above-described weather information 41 (see FIG. 3). Then, by multiplying the power consumption per unit time of the air conditioner 302 into which the previously predicted setting temperature is inputted and the travelling time together, the information providing device 100 calculates the second power consumption amount consumed in the case where the air conditioner 302 is operated during the vehicle travel in the second unit area.

In addition, in the case where the first unit area and the second unit area are the same (are the common area), the information providing device 100 could also calculate the second power consumption amount by obtaining the travelling time of the first unit area (the second unit area) included in the travel information 242 (see FIG. 2) and multiplying the power consumption per unit time of the air conditioner 302 and the travelling time together.

Moreover, the information providing device 100 is configured to recalculate the second power consumption amount when the flag, indicating that the change in the contents of the weather information obtained at the predetermined time interval occurs, is raised.

Next, the totalizing function of the total power consumption amount calculating function, which the information providing device 100 has, will be explained. The information providing device 100 calculates the total power consumption amount on the basis of the first power consumption amount calculated by the first power consumption calculating function and the second power consumption amount calculated by the second power consumption calculating function. More specifically, for each travelling route, by totalizing the first power consumption amounts calculated for each first unit area from the present position to the destination on the travelling route, a first total power consumption amount consumed to travel along the travelling route is determined. Further, for each travelling route, by totalizing the second power consumption amounts calculated for each second unit area from the present position to the destination on the travelling route, a second total power consumption amount required for the operation of the air conditioner 302 into which the predicted setting temperature is inputted when travelling along the travelling route is determined. Then, by adding the first total power consumption amount and the second total power consumption amount together, the total power consumption amount of the case where the vehicle travels along the travelling route with the air conditioner 302 operated at the predicted setting temperature corresponding to the predicted outside air temperature, is calculated.

Also in this totalizing process, when the flag, indicating that the change in the contents of the weather information obtained at the predetermined time interval occurs, is raised, it is possible to calculate the total power consumption amount by adding the recalculated second power consumption amount and the previously calculated first power consumption amount together.

Next, the information providing function of the information providing device 100 will be explained. The information providing device 100 provides the information about the power consumption amount of the vehicle to the user. More specifically, the information providing function has a power evaluating function that creates information for evaluating the calculated total power consumption amount and an output controlling function that outputs information about the total power consumption amount including this evaluation to the output device 52.

First, the power evaluating function of the information providing device 100 of the present embodiment compares the total power consumption amount calculated by the power consumption amount calculating function with a battery remaining capacity obtained from the vehicle or with a maximum charge amount of the vehicle. Then when the battery remaining capacity of the vehicle or the maximum charge amount of the vehicle is less than the total power consumption amount, the power evaluating function creates information about the total power consumption amount including charge information.

A current battery remaining capacity is obtained from the battery remaining capacity sensor 301 through the vehicle controller 300. When the current battery remaining capacity is equal to or less than the total power consumption amount required to travel up to the destination, since the power will be insufficient, the information providing device 100 creates information about the total power consumption amount including indication that there is a necessity to charge the battery, the place of the charging facility around the present position, etc., in order to prompt the user to charge the battery before the drive.

Further, when the current battery remaining capacity is equal to or less than the total power consumption amount and also the maximum charge amount of the vehicle is equal to or less than the total power consumption amount, since the current battery remaining capacity is insufficient for the power required to travel up to the destination and also even if the battery is fully charged before the drive, the power will be short in the middle, the information providing device 100 creates information about the total power consumption amount including indication that there is a necessity to charge the battery in the middle of the travelling route, the place of the charging facility provided in the middle of the travelling route, etc.

In this case, the power evaluating function of the information providing device 100 refers to charging facility information 244 of the map information 240, and selects the charging facility that can charge the battery of the vehicle. A criterion of the selection of the charging facility is not especially limited. The information providing device 100 could select a nearest charging facility from the present position of the vehicle, a charging facility provided along a vehicle travelling direction on the travelling route, a charging facility positioned at a place where a mileage becomes a minimum when stopping by, a charging facility positioned at a place where the power consumption becomes a minimum when stopping by, etc.

In addition, when a sum of a power amount charged at the selected charging facility and the vehicle battery remaining capacity before the charging (a vehicle battery remaining capacity not yet charged) is equal to or less than the total power consumption amount, the power evaluating function of the information providing device 100 further selects the charging facility where the vehicle is charged. With this process, the charging facility can be successively selected until the vehicle secures the power required to travel up to the destination by the charging.

Then, the power evaluating function of the information providing device 100 creates information about the total power consumption amount including information of the selected charging facility. The charging facility information includes a position (an address, a point on the map) of the selected charging facility, a telephone number and service contents of the selected charging facility.

Further, the power evaluating function of the information providing device 100 re-searches for a new travelling route from the present position to the destination with the selected charging facility being a stop-by point (through the selected charging facility) (or the power evaluating function makes the navigation system 200 execute re-searching), then creates information about the total power consumption amount including map information in which the re-searched new travelling route is indicated. According to such information, it is possible for the user to know which charging facility the user should use in the middle of the travelling route and to know a route up to the destination after stopping by at the charging facility.

Finally, the output controlling function of the information providing device 100 will be explained. The information providing device 100 controls the output so as to indicate or provide the information about the total power consumption amount calculated by the above-described power consumption amount calculating function to the user of the vehicle through the output device 52. The output device 52 is a device having the display and/or the speaker.

The information providing device 100 makes the output device 52 output the information about the total power consumption amount including the necessity of charging, the place of the charging facility, the travelling route from the present position to the destination with the charging facility being the stop-by point, etc., in addition to the travelling route from the present position to the destination. The information about the total power consumption amount could be shown by being overlaid on the travelling route, or shown in other part on the display. Alternatively, the information about the total power consumption amount could be provided by voice or sound through the speaker.

In the present embodiment, the example in which the information providing device 100 is arranged as the server device on the network is shown. In the case where the information providing device 100 is not mounted in the vehicle, but arranged as the server device on the network in this manner, access from vehicle interior and exterior is allowed, thereby increasing its usefulness.

In the case where the information providing device 100 is mounted in the vehicle, by connecting the information providing device 100 to the vehicle-mounted vehicle controller 300 and the vehicle-mounted navigation system 200 through a CAN (Controller Area Network) and the other vehicle-mounted LAN, the above operation can be achieved. In the case where the information providing device 100 is mounted in the vehicle, since it is possible to immediately obtain the information from the vehicle side, a high-speed process can be achieved.

Next, operations of the information providing device 100 of the present embodiment will be explained on the basis of FIG. 6 to FIG. 8. Here, as examples, operations of the drive plan system 1 including the information providing device 100 of the present embodiment will be explained.

Figure 6:
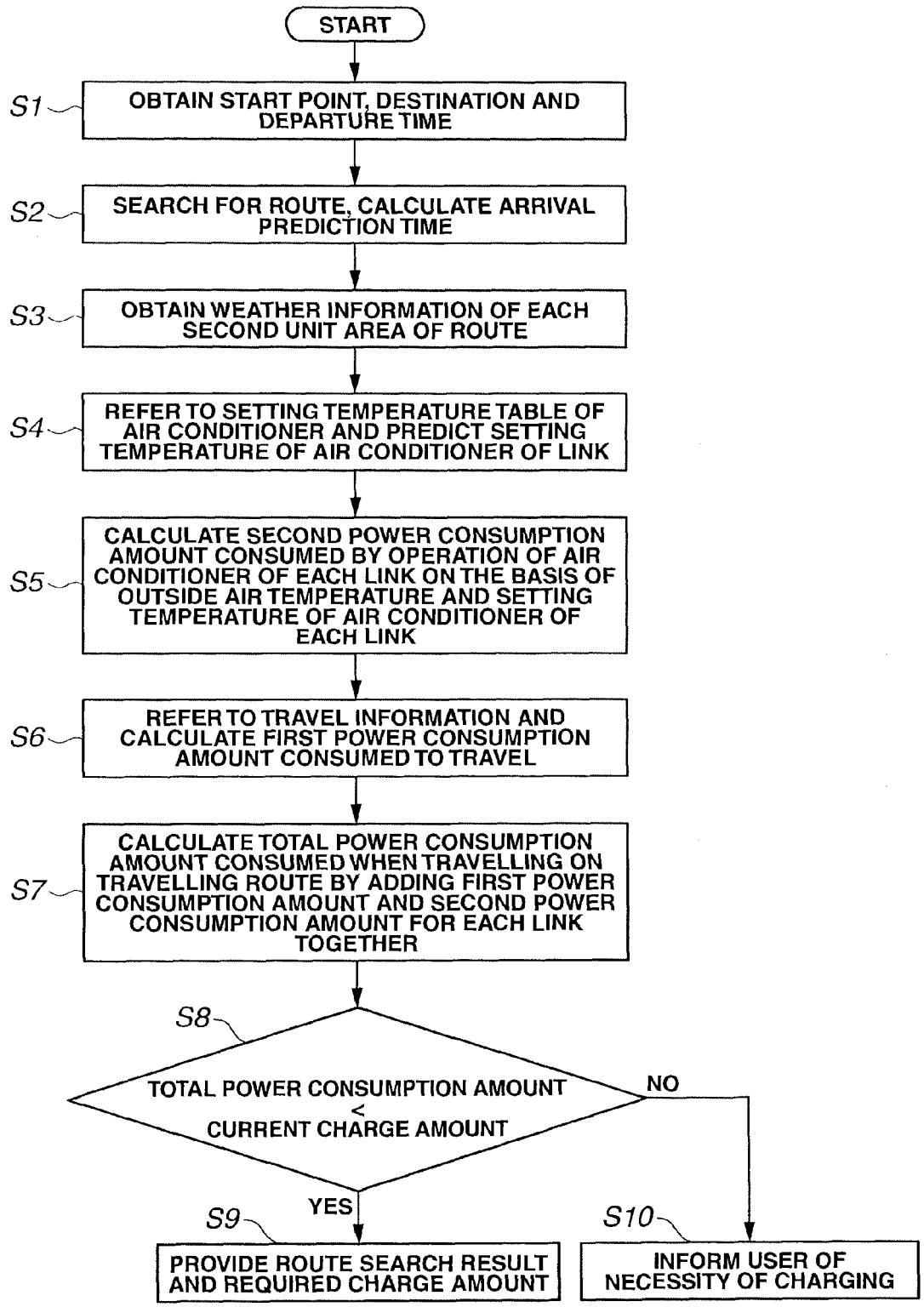
FIG. 6 is a flow chart showing an example of a procedure of a control process of the information providing device 100 of the present embodiment according to the present invention.

FIG. 6 is a flow chart showing an example of a procedure of a control process of the information providing device 100 of the present embodiment according to the present invention. FIG. 7 is a flow chart showing an example of a procedure of a further control process of the information providing device 100 of the present embodiment according to the present invention. FIG. 8 is a flow chart showing another example of a procedure of a control process of the information providing device 100 of the present embodiment according to the present invention.

As shown in FIG. 6, first, at step S1, the information providing device 100 obtains the departure point (the start point), the destination and a departure time of the drive of the user's plan through the input device 51 of the terminal equipment 500. If the start point is the present position of the vehicle, it could be possible to obtain the present position detected by the present position detection device 305.

At step S2, the information providing device 100 sends the start point obtained and the destination obtained to the present position obtaining device 21 and the destination obtaining device 23 of the navigation system 200. Then, the information providing device 100 makes the route searching device 22 of the navigation system 200 refer to the map information 240 and execute the search of the travelling route from the start point to the destination. The route searching device 22 searches for the travelling route from the present position to the destination, and calculates an arrival prediction time when the vehicle arrives at the destination.

At step S3, the information providing device 100 obtains, on the basis of the searched travelling route and time when the vehicle passes through each point on the travelling route, the weather information 41 (see FIG. 3) of each area of the travelling route from the weather server 400. More specifically, the information providing device 100 separates the travelling route, and obtains the weather information 41 of the second unit area (the link or the mesh) of the separated route. At this time, the information providing device 100 obtains the weather information 41 of time when the vehicle passes through each second unit area (each link or each mesh). In this process, as an example, the case where the second unit area is the link will be explained.

At subsequent step S4, by using a fact that there appears a certain relationship (a trend) between the setting temperature of the air conditioner 302 and the outside air temperature, the information providing device 100 refers to the setting temperature table 131 (the correlation) as shown in FIG. 4 which is created on the basis of the history of the setting temperature inputted into the air conditioner 302 and indicates the vehicle exterior temperature and the setting temperature, then predicts the setting temperature that is inputted into the air conditioner 302 when travelling in the second unit area.

The setting temperature table 131 (the correlation) could be a setting temperature table that is created on the basis of an experimental data, or might be a setting temperature table that is created by statistical processing (an average, a mode, etc.) on the basis of the input history of the air conditioner 302 and the outside air temperature upon the input.

Further, since there arises a case where the setting temperature of the air conditioner 302 is different according to the individual feeling, by determining the setting temperature on the basis of the history of the user, the setting temperature of the air conditioner 302 can be accurately estimated (predicted). In this case, the information providing device 100 obtains the user ID and refers to the setting temperature table 131 (the correlation) in which the vehicle exterior temperature (the outside air temperature) and the setting temperature are correlated with each other for each user ID, then can predict the mode or the average of the input history of the setting temperature of the air conditioner 302 corresponding to each outside air temperature for the user, as the setting temperature of the air conditioner 302 corresponding to the certain outside air temperature.

At step S5, the information providing device 100 calculates each power consumption amount per unit time consumed by the operation of the air conditioner 302 in the case where the air conditioner 302 into which the predicted setting temperature is inputted is operated in a condition of the outside air temperature predicted when travelling in each link (the second unit area). More specifically, the information providing device 100 refers to the power consumption table 132 shown in FIG. 5, and determines each power consumption amount per unit time consumed by the operation of the air conditioner 302, of the outside air temperature and the predicted setting temperature. At this time, in the case where the power consumption table 132 defines the power consumption separately according to the solar radiation status, it is possible to determine the power consumption amount with consideration given to the solar radiation status included in the weather information 41.

Subsequently, the information providing device 100 obtains the travelling time of each link from the travel information 242 or the weather information 41. Then, by multiplying a second power consumption amount per unit time consumed by the operation of the air conditioner 302 and the travelling time together, the information providing device 100 calculates the second power consumption amount consumed when passing through the link (the second unit area) of the case where the air conditioner 302 is operated at the setting temperature in the condition of the predicted outside air temperature.

Here, in this example of the process, the case where the first unit area and the second unit area are the common link is explained as an example. However, in a case where the first unit area and the second unit area are the different area, there is a need to obtain the travelling time of the link that is correlated with the second unit area, by referring to the weather information 41.

At next step S6, the information providing device 100 refers to the travel information 242 (see FIG. 2) including the motor power consumption amount correlated with each link (the first unit area) belonging to the searched travelling route, and calculates each first power consumption amount consumed to travel in each link (the first unit area).

Then, at step S7, the information providing device 100 adds the first power consumption amount for each link (the first unit area) belonging to the travelling route and the second power consumption amount for each link (the second unit area) belonging to the travelling route together, and calculates the total power consumption amount consumed when travelling on the travelling route.

At subsequent step S8, the information providing device 100 compares the total power consumption amount calculated at step S7 with a current charge amount (the current battery remaining capacity). When the battery remaining capacity of the vehicle is greater than the total power consumption amount, since there is no problem about the power for the drive, the routine proceeds to step S9. Then the information providing device 100 creates the searched travelling route and a power (a battery charge amount) required to travel up to the destination by this travelling route, and provides them to the user through the output device 52.

On the other hand, when the battery remaining capacity (the current charge amount) of the vehicle is equal to or less than the total power consumption amount at step S8, the routine proceeds to step S10. Then the information providing device 100 creates the information about the total power consumption amount including the charge information such as the necessity of charging, and provides it to the user through the output device 52. It is therefore possible to inform the user that the charging is necessary before the drive.

Figure 7:
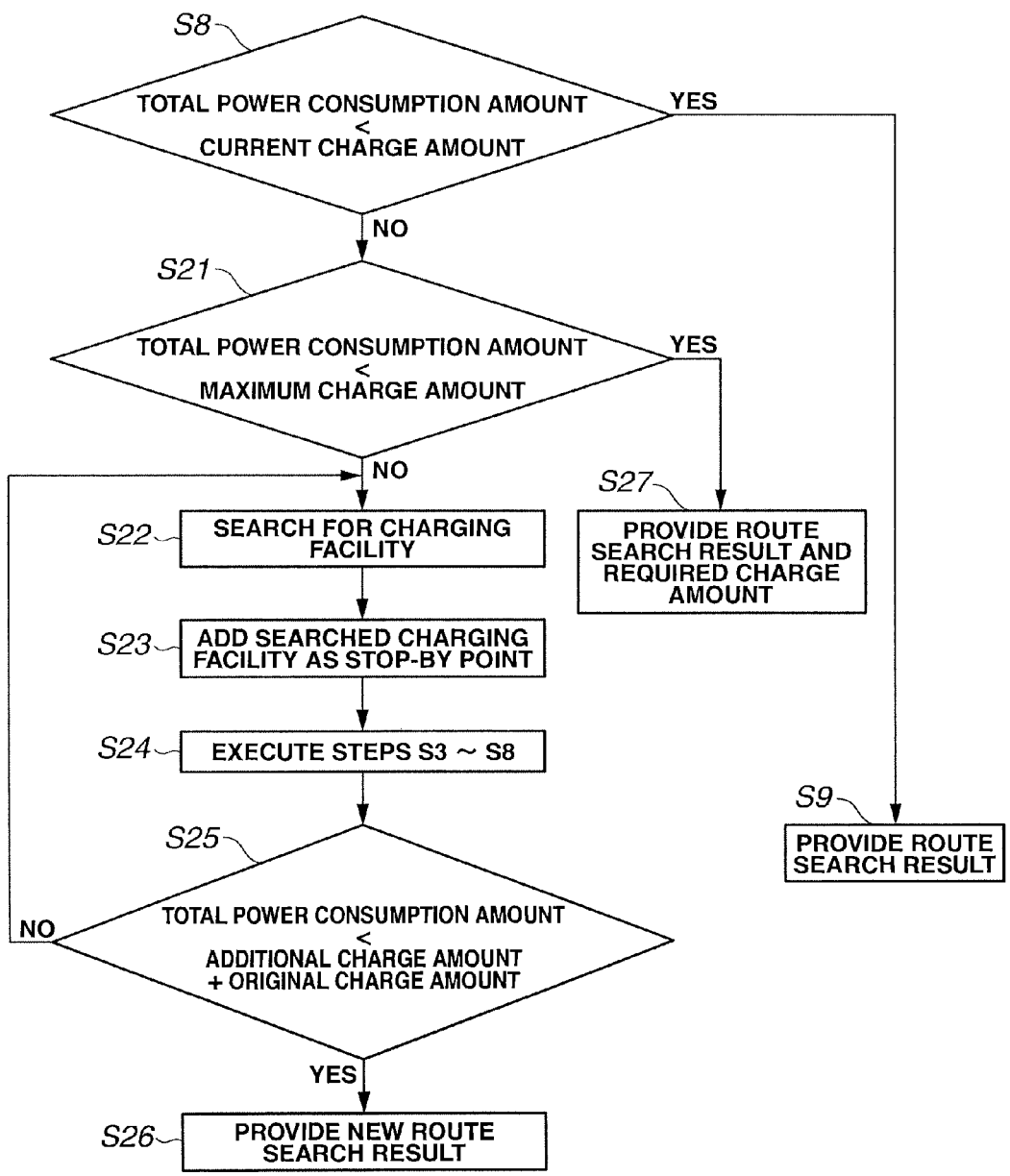
FIG. 7 is a flow chart showing an example of a procedure of a further control process of the information providing device 100 of the present embodiment according to the present invention.

In addition to the process shown in FIG. 6, a process shown in FIG. 7 can be performed after the process shown in FIG. 6.

As shown in FIG. 7, when the battery remaining capacity of the vehicle is equal to or less than the total power consumption amount at step S8 in FIG. 6, the routine proceeds to step S21. At step S21, the information providing device 100 compares the allowable maximum charge amount of the vehicle with the total power consumption amount. When the maximum charge amount is greater than the total power consumption amount, the routine proceeds to step S27, and the information providing device 100 shows or provides a result of the route search and a required charge amount. The user can therefore know a power amount which should be charged before the drive, and can previously plan the charging.

On the other hand, when the maximum charge amount is equal to or less than the total power consumption amount at step S21 in FIG. 7, since the battery remaining capacity is insufficient for the power required to travel up to the destination even if the battery is charged, the routine proceeds to step S22, and the information providing device 100 makes the navigation system 200 search for the charging facility to charge the vehicle. Although the manner of the search of the charging facility is not especially limited, in the present embodiment, the charging facility provided along the vehicle travelling direction on the travelling route is selected in preference to the other charging facilities.

At subsequent step S23, the information providing device 100 adds the searched charging facility as the stop-by point, and makes the navigation system 200 re-search for the travelling route from the present position to the destination.

At step S24, the information providing device 100 executes steps S3 to S8 shown in FIG. 6 for a new travelling route, and obtains a total power consumption amount for the new travelling route.

Subsequently, at step S25, the information providing device 100 compares the total power consumption amount calculated at step S7 of the reprocessing with the sum of an additional charge amount charged at the searched charging facility and an original charge amount (the current charge amount or the charge amount before the charging). Here, regarding the charge amount before the charging at the charging facility, it can be determined by calculating a total power consumption amount consumed from the present position to the charging facility by the execution of the above steps S3 to S8 then subtracting the calculated total power consumption amount from the current charge amount.

At step S25, if the sum of the additional charge amount charged at the searched charging facility and the original charge amount (the current charge amount or the charge amount before the charging) is greater than the recalculated total power consumption amount, since a power shortage is solved by the charging, the routine proceeds to step S26, and the information providing device 100 shows or provides a new result of the route search including the charging facility as the stop-by point through the output device 52.

On the other hand, at step S25, when the sum of the additional charge amount charged at the searched charging facility and the original charge amount (the current charge amount or the charge amount before the charging) is equal to or less than the recalculated total power consumption amount, since the power shortage is not solved by only the charging at the searched charging facility, the routine returns to step S22, then the other charging facility is searched. By repeating this routine, it is possible to suggest the travelling route by which the power required to travel up to the destination can be secured to the user.

Next, an example of a recalculation process of the total power consumption amount in the drive plan system 1 will be explained on the basis of FIG. 8.

Figure 8:
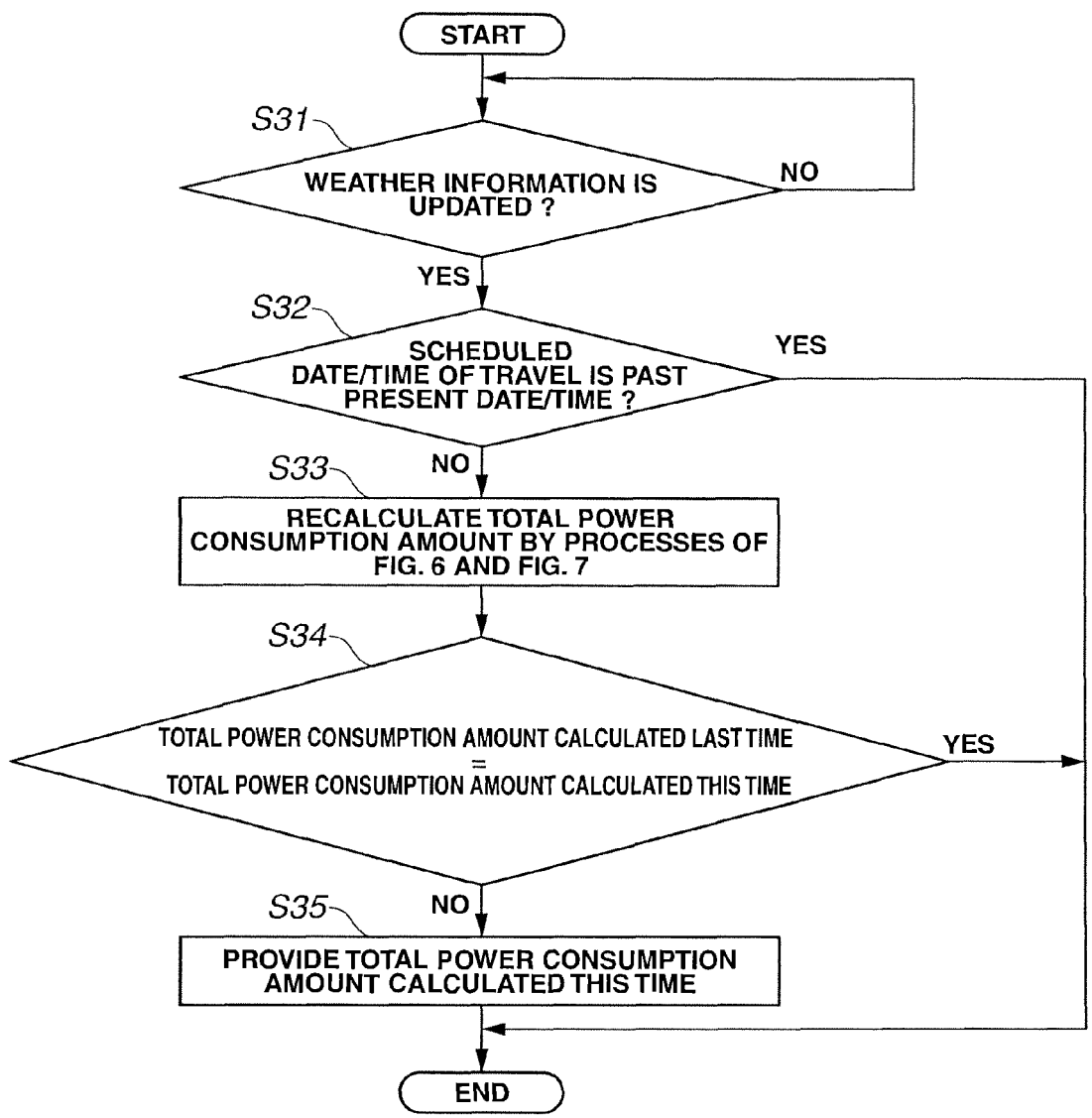
FIG. 8 is a flow chart showing another example of a procedure of a control process of the information providing device 100 of the present embodiment according to the present invention.

As shown in FIG. 8, at step S31, regarding the weather information 41 obtained at the predetermined time interval from the weather server 400, the information providing device 100 compares the weather information 41 obtained last time with the weather information 41 obtained this time. Then, the information providing device 100 judges whether or not there is a change in contents of the weather information 41, namely that the information providing device 100 judges whether or not the weather information 41 is updated.

When the weather information 41 is updated, the routine proceeds to step S32. Then the information providing device 100 judges whether or not the scheduled date/time of the travel (the date/time of the drive plan) that is inputted at step S1 in FIG. 6 is past the present date/time.

When the scheduled date/time of the travel (the date/time of the drive plan) is not past the present date/time, the routine proceeds to step S33. When the scheduled date/time of the travel (the date/time of the drive plan) is past the present date/time, the routine proceeds to "END". At step S33, the information providing device 100 recalculates the total power consumption amount shown in FIG. 6 and FIG. 7.

At step S34, the information providing device 100 compares the total power consumption amount calculated last time with the total power consumption amount calculated this time. If the both are the same, since there is no need to provide or show new information, the routine proceeds to "END". On the other hand, when the both are not the same, the routine proceeds to step S35, and the information providing device 100 provides or shows the total power consumption amount calculated this time through the output device 52. It is therefore possible to provide the information about a newest (or an up-to-date) total power consumption amount according to the change of the weather to the user.

The present invention is configured in the above explained manner and performs the above operation. The present invention has the following effects.

According to the information providing device 100 and the information providing method of the above embodiment of the present invention, the total power consumption amount is calculated on the basis of the first power consumption amount consumed to travel in the unit area which is calculated by referring to the travel information correlated with the unit area of the travelling route leading to the destination and the second power consumption amount consumed in the case where the air conditioner 302 is operated, during the travel in the unit area, at the setting temperature predicted by referring to the weather information that is predicted for each unit area of the travelling route. Hence, it is possible to provide accurate information about the power consumption amount of the vehicle to the user of the vehicle with consideration given to a utilization state of the vehicle air conditioner 302 according to the change of the weather.

According to the present invention, since the total power consumption amount is calculated with the power amount consumed when the air conditioner 302 is operated at the predicted setting temperature included, the total power consumption amount according to the weather can be estimated (predicted). As a consequence, even if the utilization state of the vehicle air conditioner changes according to the change of the weather, it is possible to provide the accurate information about the power consumption amount to the user.

Here, with regard to related art drive plan service, there is service that provides the travelling route from the present position, the stop-by point, the destination and the scheduled date of the travel. However, there is no service or no device (no system) that takes account of the weather on that day (on the scheduled date) also takes into consideration the fact that when the vehicle travels, what temperature the user sets for the air conditioner 302 during the actual travel. According to the information providing device 100 of the present embodiment, the information providing device 100 also predicts how the user sets or changes the setting temperature of the air conditioner 302 upon the operation of the air conditioner 302 for the weather on that day, then calculates the power consumption. It is thus possible to provide the accurate information to the user.

Here, in the case where the vehicle is the electric vehicle or the hybrid vehicle, if it is not possible to accurately judge a balance between the charged power and the power consumption, there might occur a problem that the power is short before arriving at the destination. However since the information providing device 100 of the present embodiment can accurately calculate the total power consumption amount consumed when travelling on the searched travelling route, it is possible to avoid the problem of the power shortage before arriving at the destination.

When calculating the second power consumption amount consumed by the operation of the air conditioner 302, the information providing device 100 of the present embodiment previously prepares the correlation (the setting temperature table 131) which correlates the outside air temperature with the setting temperature and is created on the basis of the history of the setting temperature inputted into the air conditioner 302, and refers to this correlation (setting temperature table 131), then predicts the setting temperature that is inputted into the air conditioner 302 when travelling in the second unit area. Therefore, the second power consumption amount consumed by the operation of the air conditioner 302 can be accurately calculated.

Although there is an individual difference in the setting temperature of the air conditioner 302, since the setting temperature can be predicted on the basis of the correlation statistically determined according to the outside air temperature, it is possible to calculate the second power consumption amount with high accuracy, as compared with a case where the power consumption amount consumed by the operation of the air conditioner 302 is calculated using a fixed value.

Especially in the case where the correlation (the setting temperature table 131) correlating the outside air temperature with the setting temperature is created on the basis of the history of each user, it is possible to calculate the second power consumption amount more accurately. Since there is an individual difference in feeling temperature of the person even the same outside air temperature, it is difficult to predict the vehicle interior setting temperature in a uniform manner. In the present embodiment, on the basis of the identifier of the user, the information providing device 100 refers to the setting temperature table 131 based on the history of the user, and can predict the setting temperature of the user. The more accurate prediction of the setting temperature can be therefore possible.

Further, when calculating the second power consumption amount consumed by the operation of the air conditioner 302, the information providing device 100 of the present embodiment calculates the second power consumption amount on the basis of the combination of the outside air temperature and the setting temperature of the air conditioner 302. It is therefore possible to calculate the second power consumption amount with even higher accuracy. The power amount consumed by the operation of the air conditioner 302 is not determined by only the setting temperature and is different by a difference from the outside air temperature. Thus, by calculating the second power consumption amount on the basis of the combination of the outside air temperature and the setting temperature of the air conditioner 302, like the present embodiment, the power consumption of the air conditioner 302 can be accurately determined, and the second power consumption amount can consequently be calculated with high accuracy.

The information providing device 100 of the present embodiment can accurately calculate the total power consumption amount consumed when travelling on the travelling route by adding the first power consumption amount calculated for each link or each mesh and the second power consumption amount calculated for each link or each mesh together along the travelling route, with the first unit area used when calculating the first power consumption amount and the second unit area used when calculating the second power consumption amount being the link of the road or the mesh of the predetermined block.

Further, since the information providing device 100 of the present embodiment calculates the second power consumption amount with consideration given to the solar radiation status, more accurate second power consumption amount can be calculated. Even if the outside air temperature and the setting temperature are the same, there is a trend in the power consumption amount of the air conditioner 302 towards increase in a case where sunlight (the solar radiation) streaming into the vehicle interior is strong, as compared with weak sunlight (weak solar radiation). In the pre sent embodiment, even if the outside air temperature and the setting temperature are the same, since the power consumption table 132 in which the power consumption amount per unit time of the air conditioner 302 is different according to the solar radiation status is prepared, the second power consumption amount according to the solar radiation status can be accurately calculated.

When the battery remaining capacity of the vehicle is equal to or less than the total power consumption amount, the information providing device 100 creates the information about the total power consumption amount including the charge information such as the necessity of charging, thereby previously informing the user that the charging is necessary to travel up to the destination.

Furthermore, when the battery remaining capacity of the vehicle and the maximum charge amount of the vehicle are equal to or less than the total power consumption amount, the information providing device 100 of the present embodiment creates the information about the total power consumption amount including the charging facility information. Therefore, the user can notice that the current battery remaining capacity of the vehicle is insufficient for the power required to travel up to the destination and also even if the battery is fully charged, the power will be short. In addition, the user can also know the information of the charging facility. As a consequence, the user can fully charge the battery before starting the drive, and also can previously plan the charging at the selected charging facility.

Moreover, in the above case, when the sum of the power amount charged at the selected charging facility and the battery remaining capacity of the vehicle before the charging is equal to or less than the total power consumption amount, the information providing device 100 further selects the charging facility where the vehicle is charged, and creates the information about the total power consumption amount including the information of the further selected charging facility. Accordingly, in a case where the destination is quite separate from the present position and the power by only one-time charging is insufficient for the travel, it is possible to provide the charging facility information to the user so as to secure the power required to travel up to the destination. The user can travel up to the destination by charging the battery in accordance with the drive plan.

In the above case, by re-searching for the new travelling route with the selected charging facility being the stop-by point, the user can know the route leading to the destination while charging the battery at the charging facility.

In the present embodiment, since the output device 52 including the display and the speaker is provided, it is possible for the user to easily grasp (see and listen to) the information about the power consumption amount.

Further, the information providing device 100 obtains the weather information 41 at the predetermined time interval, then when the weather information 41 obtained this time is different from the weather information 41 obtained last time, the information providing device 100 recalculates the second power consumption amount. It is thus possible to determine the accurate second power consumption amount according to the change of the weather information 41.

Furthermore, in the case where the information providing device 100 is mounted in the vehicle, since it is possible to immediately obtain the information from the vehicle side, a high-speed process can be achieved.

The embodiment explained above is the one that is described to easily understand the present invention, and the present invention is not limited to this embodiment. Therefore, each element or component disclosed in the above embodiment includes all elements or components undergone engineering-change and all equivalent elements or components which are included in the technical scope of the present invention.

That is, in the present specification, although the drive plan system 1 including the information providing device 100 has been explained as an example of an embodiment of the information providing device and the information providing method, the present invention is not limited to this embodiment.

Further, in the present specification, as an embodiment of the information providing device of the present invention, although the information providing device 100 including the CPU 11, the ROM 12 and the RAM 13 has been explained, the information providing device is not limited to this device.

In addition, in the present specification, as an embodiment of an information providing device having; a travelling route searching section or means, a power consumption amount calculating device or section or means having a first calculating section or means, a second calculating section or means and a totalizing section or means, and a power evaluating section or means as required and an outputting section or means as required, of the present invention, the information providing device 100 having; the travelling route searching function, the power consumption amount calculating function having the first calculating function, the second calculating function and the totalizing function, and the power evaluating function as required and the output controlling function as required, has been explained. However, the information providing device is not limited to the information providing device 100.

The invention claimed is:

1. An information providing device for a vehicle, which provides information about a power consumption amount of the vehicle to a user on the basis of a total power consumption amount, the information providing device comprising:
   a travelling route searching section that searches for a travelling route leading to a destination by referring to map information on the basis of a present vehicle position obtained and the destination obtained; and
   a power consumption amount calculating section that calculates the total power consumption amount consumed when travelling on the searched travelling route, and has:
      a first calculating section that refers to travel information correlated with a first unit area that belongs to the searched travelling route and calculates each first power consumption amount consumed to travel in the first unit area;
      a second calculating section that refers to weather information forecasted for each second unit area that belongs to the searched travelling route, predicts a setting temperature that is inputted into an air conditioner when travelling in the second unit area and calculates each second power consumption amount consumed in a case where the air conditioner into which the predicted setting temperature is inputted is operated during the travel in the second unit area; and
      a totalizing section that calculates the total power consumption amount on the basis of the first power consumption amount and the second power consumption amount.

2. The information providing device for the vehicle as claimed in claim 1, wherein:
   the second calculating section refers to a correlation between an air temperature outside the vehicle and the setting temperature which is created on the basis of a history of the setting temperature inputted into the air conditioner, and predicts the setting temperature inputted into the air conditioner when travelling in the second unit area.

3. The information providing device for the vehicle as claimed in claim 1, wherein:
   the second calculating section obtains a user ID, refers to a correlation between an air temperature outside the vehicle and the setting temperature which is created for each user of the vehicle on the basis of a history of the setting temperature inputted into the air conditioner, and predicts the setting temperature inputted into the air conditioner when the user travels in the second unit area.

4. The information providing device for the vehicle as claimed in claim 1, wherein:
   the second calculating section calculates the second power consumption amount on the basis of the predicted setting temperature inputted into the air conditioner when travelling in the second unit area and the outside air temperature included in the weather information forecasted for the second unit area.

5. The information providing device for the vehicle as claimed in claim 1, wherein:
   the first unit area and/or the second unit area belong to the searched travelling route, and are a link of road which is defined in the map information.

6. The information providing device for the vehicle as claimed in claim 1, wherein:
   the first unit area and/or the second unit area belong to the searched travelling route, and are a mesh which is defined in the map information.

7. The information providing device for the vehicle as claimed in claim 1, wherein:
   the second calculating section predicts a solar radiation status when travelling in second unit area on the basis of the weather information, and calculates the second power consumption amount consumed in the case where the air conditioner into which the predicted setting temperature is inputted is operated during the travel in the second unit area with consideration given to the predicted solar radiation status.

8. The information providing device for the vehicle as claimed in claim 1, further comprising:
   a power evaluating section that compares the total power consumption amount calculated by the power consumption amount calculating section with a battery remaining capacity obtained from the vehicle or with a maximum charge amount of the vehicle, and when the battery remaining capacity of the vehicle is equal to or less than the total power consumption amount, creates information about the total power consumption amount including charge information.

9. The information providing device for the vehicle as claimed in claim 8, wherein:
   when both of the battery remaining capacity of the vehicle and the maximum charge amount of the vehicle are equal to or less than the total power consumption amount, the power evaluating section selects a charging facility that can charge the vehicle, and creates information about the total power consumption amount including information of the selected charging facility.

10. The information providing device for the vehicle as claimed in claim 9, wherein:
    when a sum of a power amount charged at the selected charging facility and the vehicle battery remaining capacity before the charging is equal to or less than the total power consumption amount, the power evaluating section further selects the charging facility where the vehicle is charged, and creates information about the total power consumption amount including information of the further selected charging facility.

11. The information providing device for the vehicle as claimed in claim 9, wherein:

the power evaluating section makes the travelling route searching section re-search for a new travelling route from the present position to the destination with the selected charging facility being a stop-by point, and creates information about the total power consumption amount including the re-searched new travelling route.

12. The information providing device for the vehicle as claimed in claim 1, further comprising:

an outputting section that provides the information about the total power consumption amount calculated by the power consumption amount calculating section to the user of the vehicle.

13. The information providing device for the vehicle as claimed in claim 1, wherein:

the second calculating section refers, at a predetermined time interval, to the weather information forecasted for each second unit area belonging to the travelling route, and when there occurs a certain change in the referred weather information, recalculates the second power consumption amount, and the totalizing section recalculates the total power consumption amount on the basis of the recalculated second power consumption amount and the first power consumption amount.

14. The information providing device for the vehicle as claimed in claim 10, wherein:

the power evaluating section makes the travelling route searching section re-search for a new travelling route from the present position to the destination with the selected charging facility being a stop-by point, and creates information about the total power consumption amount including the re-searched new travelling route.

* * * * *